United States Patent [19]

Minnick et al.

[11] 4,153,655

[45] May 8, 1979

[54] PRODUCTS FROM MOLTEN FLY ASH AND SCRUBBER SLUDGE INCLUDING FLY ASH

[76] Inventors: Leonard J. Minnick, 306 Boyer Rd., Cheltenham, Pa. 19012; William C. Webster, 3008 Potshop Rd., Norristown, Pa. 19403; Charles L. Smith, 34 Corson Rd., Conshohocken, Pa. 19428

[21] Appl. No.: 708,200

[22] Filed: Jul. 23, 1976

Related U.S. Application Data

[63] Continuation of Ser. No. 607,931, Aug. 30, 1975, abandoned, which is a continuation of Ser. No. 450,065, Mar. 11, 1974, abandoned.

[51] Int. Cl.² .............................................. B01J 2/02
[52] U.S. Cl. ...................................................... 264/8
[58] Field of Search ........................................ 264/5, 8

[56] References Cited

U.S. PATENT DOCUMENTS

| 2,257,878 | 10/1941 | Brennan | 264/5 |
|---|---|---|---|
| 3,887,667 | 6/1975 | Clark | 264/8 |
| 3,896,203 | 7/1975 | Maringer | 264/8 |

*Primary Examiner*—Robert F. White
*Assistant Examiner*—James R. Hall
*Attorney, Agent, or Firm*—Miller & Prestia

[57] ABSTRACT

Methods of making finely divided product from fly ash compositions, including both dry fly ash compositions and aqueous suspensions of fly ash in combination with alkaline earth metal compounds. The fly ash composition, preferably including 10 to 50% combined alkaline earth metal oxides, is heated to molten condition while collecting gases evolving therefrom, including sulfur oxide gases. The top portion of the melt is then poured in a manner causing a molten stream thereof to be divided into a multiplicity of fractions and cooled to solid form while encompassed by a fluid cooling medium in a manner to produce either a shot or a granulated aggregate product. The bottom portion of the melt is nearly pure metallic iron which is recovered, as such, for other uses. Preferably, the molten stream impinges on a rotating member in a manner to produce shot, or is quenched in a water bath to form a granulated type product.

1 Claim, No Drawings

PRODUCTS FROM MOLTEN FLY ASH AND SCRUBBER SLUDGE INCLUDING FLY ASH

This is a continuation of application Ser. No. 607,931, filed Aug. 20, 1975, which is in turn a continuation of application Ser. No. 450,065, filed Mar. 11, 1974, now abandoned.

This invention pertains to methods of converting fly ash compositions into useful materials. More particularly, it pertains to methods for producing shot or granulated aggregate from various fly ash compositions, including specifically those fly ash compositions which include, in addition to fly ash, alkaline earth metal oxides in a significant degree, such as those compositions found in the sludge product of scrubbers for desulfurization of stack gases from coal burning combustion units.

Fly ash, in its most common form, is the finely divided particulate material recovered from the stack gases of coal burning combustion units, particularly pulverized coal burning combustion units. It is known to have unique chemical and physical properties and a wide variety of uses have been found for fly ash. However, large quantities of fly ash are produced and a substantial part of the large quantities is considered waste material for which there is not presently a sufficient market.

In addition, fly ash also occurs in some forms of compositions in which its known utility is somewhat limited. For example, a significant amount of fly ash is captured in the underflow sludge product of desulfurization scrubbers. The ash in these compositions is in combination with other solids in an aqueous suspension, the other solids generally comprising alkaline earth metal compounds, particularly calcium and magnesium carbonates, hydroxides, oxides, sulfates, and sulfites.

With this background in mind, it is the general object of the present invention to provide methods of making shot or granulated aggregate-type products from fly ash compositions.

It is a more specific object of this invention to provide such methods which are more practical than those heretofore available by virtue of requiring less heat or in which various by-products are made or recovered so as to enhance the economic attractiveness of the process.

Briefly, the present invention comprises a method of making a finely divided product from fly ash compositions consisting of heating the compositions until a melt is formed and then pouring the melt in a manner causing the molten stream to be divided and fused into a multiplicity of spheroids (shot) or particles of random size and shape (granulated aggregate). The former results when the molten stream impinges, in a specific way, on a rotating member and cools while in flight after being thrown tangentially from the rotating member. The latter product (granulated aggregate) occurs when the melt is poured into a quench bath (typically water). In order to reduce the heat necessary for this process, it is preferred that the fly ash composition be heated in the presence of sufficient alkaline earth metal compounds, particularly lime or calcium or magnesium oxides or hydroxides, to raise the combined alkaline earth metal oxide, particularly calcium oxide and magnesium oxide, content thereof, exclusive of water, to 10–50%, by weight. Depending on composition (chiefly lime content), the color of the product may vary from black to nearly white.

Various methods may be used to divide the molten stream, as it is poured so that it solidifies into a finely divided product. A liquid quench bath is preferred if the desired product is an aggregate of random particle size and shape.

Alternatively, the stream is poured onto a rotating mechanical member which the molten stream impinges upon and from which the stream is thrown off in finely divided form, in a direction tangential to the rotating mechanical member into a space, such as an air space, comprising a gaseous cooling environment. In this space, the particles assume wool-like, sphere-like or spherical shapes (due to surface tension in the melt particles and/or their velocity) and fuse or solidify while encompassed by the gaseous cooling environment before striking a solid surface.

Such a rotating mechanical member may take various forms but two such forms are that in which the rotating member is a disc rotated in a horizontal plane (in which case a barrier collector wall is disposed circumferentially about the rotating disc) and that in which the rotating member is similar to the blower or squirrel cage used in many fans. Such a member consists of a plurality of horizontally disposed elements suspended between two circumferential supports in parallel vertical planes, the supports having a central bearing sleeve surrounding a horizontal axis about which the member rotates. A thick rotating gear is a less preferred alternative to the squirrel cage rotor.

When the molten stream is poured onto such a rotating gear or squirrel cage member, a collection tunnel may be used to collect the finely divided product. The collection tunnel generally is disposed horizontally (or with a slight downward arc or slope) and tangentially of the rotating member. If a disc rotating in a horizontal plane is used, a circumferential wall surrounding the disc may serve as the product collector. Depending upon the vertical drop of the molten stream onto the rotating member and the radial position at which the stream impinges upon the rotating member, the product may vary in its mechanical form from that of a finely divided glass wool to a fairly large particle granulated aggregate type material.

With respect to these various types of rotating mechanical members, the squirrel cage is preferred as is the shot products. To produce shot, the melt is permitted to impinge on the horizontal elements of the squirrel cage in the 45° sector bounded by top dead center and extending away from that point in the local direction of travel of the rotor at top dead center. The melt should be relatively fluid at the point of impingement but the speed of rotation of the rotor does not seem to be critical, at least within the range of 600 to 1700 RPM.

Further, a quench bath may be disposed so as to collect the tangentially thrown finely divided product after the impingement of the molten stream upon the rotating member.

Regardless of the form (i.e., wool, shot or granulate) of the product of the present invention, it is relatively amorphous. Upon particle size reduction, such as by grinding, a further useful product may be formed, namely a reactive material, with pozzolanic activity in cementitious compositions. The reduced particle size form of this product, to the extent it includes a relatively high CaO-MgO content, will also have lime-like reactivity, and may be used as a lime supplement or replacement.

In one particularly preferred form of the present invention, the fly ash composition is a scrubber sludge comprising an aqueous suspension of fly ash and alkaline earth metal compounds, generally including calcium and magnesium oxides, hydroxides, carbonates, sulfates and sulfites. When such scrubber sludges from desulfurization scrubbers are used in the method of the present invention, gases evolving from the fly ash composition during the heating thereof are collected. These gases generally include sulfur oxide gases such as sulfur dioxide and sulfur trioxide. Collection of these gases by contact of the gases with water is preferred and a useful acid by-product may be produced in this manner.

It is also preferred to pour only the top 85-95% of the melt to form a finely divided product. The remaining 5-15%, at the bottom of the fly ash melt, is relatively pure metallic iron which may be recovered and sold as such. The proportion of such iron in any given melt will of course, vary from fly ash to fly ash but generally it has been found that the iron constitutes about 10%, by weight, of the melt.

For a better understanding of this invention, reference is made to the appended claims and to the following further description and illustrative examples.

Generally, the present invention involves making finely divided products, particularly glass shot and granulated aggregate, by finely dividing a molten stream produced by heating fly ash. A water quench bath may be used to cause the fine division of the melt into particles of random size and shape. Alternatively, the molten stream is caused to impinge on a rotating member, such as a wheel rotating in a horizontal plane or a squirrel cage or fan type rotor rotating in a vertical plane with horizontal elements disposed circumferentially about the rotor. In either event, the finely divided fractions of molten fly ash liquid are thrown off tangentially and may be collected in a tunnel (or along a barrier wall in the case of a rotating disc) or in a water quench bath provided for that purpose.

The product may be made more finely divided, such as by grinding in a ball or tube mill, to produce a reactant having pozzolanic and/or lime activity.

Preferably the melt is poured into a quench bath to make an aggregate type product or onto a rotating squirrel cage-type member to make shot.

It is also preferred to include in the fly ash composition a significant amount of alkaline earth metal oxides or hydroxides such as to provide in the analysis of the melt combined alkaline earth metal oxides on the order of 10-50%. These compounds, typically magnesium and/or calcium oxides or hydroxides, (both of which are reported as oxides in conventional fly ash analysis) may be provided from the coal source, in the case of lignitic coal, or they may be added to the melt as a flux. Still further, these compounds may be present in desulfurization scrubber sludges as a result of the excess liming agent usually used in desulfurization processes.

The calcium oxide-magnesium oxide content, in accordance with one aspect of the present invention, provides a fluxing effect, reducing the fusion temperature of the fly ash and thus reducing the energy required to make finely divided glass-like products therefrom. They also result in lime-like reactivity in the final product, in reduced particle size form.

This method of producing a finely divided product from scrubber sludge including fly ash also is a highly desirable method of disposal of such scrubber sludges, which are now otherwise considered waste products. If the starting fly ash material is a scrubber sludge, or a sulfur-containing fly ash, such as may result from lime or limestone injection into hot flue gases, it should be noted that evolving gases must be collected since they ordinarily include significant amounts of sulfur oxides, such as sulfur dioxide and sulfur trioxide. Such sulfur oxide gases may be reduced to produce a pure sufur by-product or they may be collected in water to produce an acid by-product. Such recovery enhances the economic attractiveness of the sludge disposal methods of this invention.

Still further, molten iron may comprise the lower portion of the melt (to the extent of about 10% thereof) and is preferably separately collected as such.

The following are several examples of the present invention, as practiced on a laboratory scale.

EXAMPLE 1

This example is drawn to a process in which aggregate if formed by quenching. Two types of fly ash, one bituminous and one lignitious, from power plants using a bituminous and lignite coal, respectively, were melted in a laboratory furnace at approximately 2500° F. The bituminous ash was from the Eddystone Plant of the Philadelphia Electric Co, while the lignitious ash was from the Hoot Lake Power Plant of the Ottertail Power Co. in Fergus Falls, Minn. The molten ash in each case, was then poured directly into a water bath. The resultant produced was very similar in that both ashes produced black irregularly shaped pellets and threads. The top size of these pellets was approximately ¼ inch. The only difference in using the two ashes was that the lignitious ash had a slightly lower melting point due to the lime content, (about 40%, by weight, combined CaO-MgO) of the ash and as a result was more fluid when poured into the water.

EXAMPLE 2

This example illustrates the making of shot, combined with mineral wool, by melting fly ash and pouring the melt onto a rotating member. In this particular example, the fly ash was melted in a laboratory cupola, a horizontally mounted, refractory-lined, 14" diameter steel pipe with an outlet hole in the bottom near one end thereof. Flame was injected from one end with the pipe tilted slightly so that the outlet opening was above the surface of the melt. The raised end was then lowered and the molten material was allowed to drop about one foot onto a 10" diameter squirrel cage, of the type often used in blowers, rotating on a horizontal axis at 600-1700 RPM (the speed varied in different test runs within this range). Black beads and pellets, combined with a wool-like fiber product, were thrown off tangentially into the surrounding air space and hardened therein.

Generally the proportion of spheroid particles, the form otherwise referred to as beads and pellets or shot, was maximized when the point of melt impingement on the rotor was in the 45° sector of the rotor extending from top dead center in the local direction of the rotor travel at that point.

In other tests, the production of a "shot" product has been optimized by pouring a molten fly ash from an induction furnace onto a squirrel cage, as described above, and thrown down a tunnel where the liquid forms a spherical shape while in flight (due to surface tension), then cools "locking into" the "perfect" spherical form.

It should be noted that in all of the foregoing it is much preferred that the fly ash composition, in order to be considered as such, includes at least 20% fly ash, by weight, exclusive of water. Moreover, it is much preferred that the composition also include significant quantities of alkaline earth metal oxides or hydroxides, calculated as magnesium oxide or calcium oxide and exceeding 10%, by weight, exclusive of water. Below 10%, it is believed that little fluxing or melt point lowering occurs so that the presence of the alkaline earth metal oxides below that range is not thought to be significant. Above 50%, it is very difficult to produce a melt of the composition. Within this range, however, a highly desirable starting composition is found and, in accordance with the present invention, may be practically employed in a variety of methods resulting in useful by-products of what would otherwise be waste materials.

It should be understood that while the present invention has been described with respect to specific embodiments, it is not limited to these embodiments and the appended claims are intended to cover not only these embodiments but all such minor variations and modifications thereof as would be obvious to those skilled in the art and which may be made by those skilled in the art without departing from the true spirit and scope of the present invention.

We claim:

1. Method of making a finely divided product from a fly ash composition consisting of heating said composition until a melt is formed and then pouring said melt onto a rotating mechanical member consisting of a plurality of horizontally disposed elements suspended between two circumferential supports in parallel vertical planes, the supports having a central bearing sleeve surrounding a horizontal axis about which the member rotates, said melt impinging upon the horizontal elements of said rotating mechanical member at a point in a 45° sector thereof bounded by top dead center and extending away from that point in the local direction of travel of said member at top dead center, said rotating member causing said molten fly ash composition to be thrown off in finely divided form in the direction of travel of said rotating member and hardening in said finely divided form in the course of travel through the air space surrounding said member.

* * * * *